US008688810B2

(12) United States Patent
Song et al.

(10) Patent No.: US 8,688,810 B2
(45) Date of Patent: Apr. 1, 2014

(54) METHOD AND APPARATUS FOR TRANSMITTING AND RECEIVING RICH MEDIA CONTENT

(75) Inventors: Jae-Yeon Song, Seoul (KR); Seo-Young Hwang, Suwon-si (KR); Kyu-Heon Kim, Seoul (KR)

(73) Assignees: Samsung Electronics Co., Ltd. (KR); University-Industry Cooperation Group of Kyung Hee University (KR)

( * ) Notice: Subject to any disclaimer, the term of this patent is extended or adjusted under 35 U.S.C. 154(b) by 546 days.

(21) Appl. No.: 12/504,351

(22) Filed: Jul. 16, 2009

(65) Prior Publication Data

US 2010/0017504 A1    Jan. 21, 2010

(30) Foreign Application Priority Data

Jul. 16, 2008  (KR) .......................... 10-2008-0069343

(51) Int. Cl.
*G06F 15/177* (2006.01)
*G06F 7/00* (2006.01)

(52) U.S. Cl.
USPC .......................................... 709/221; 707/756

(58) Field of Classification Search
USPC .......................................... 709/221; 707/756
See application file for complete search history.

(56) References Cited

U.S. PATENT DOCUMENTS

| 7,039,875 | B2 * | 5/2006 | Khalfay et al. ................ 715/762 |
| 7,108,171 | B1 * | 9/2006 | Ergo et al. ..................... 235/375 |
| 7,212,837 | B1 * | 5/2007 | Calhoun et al. ............... 455/560 |
| 2002/0004755 | A1 | 1/2002 | Balthaser |
| 2004/0222992 | A1 * | 11/2004 | Calkins et al. ............... 345/473 |
| 2006/0010162 | A1 * | 1/2006 | Stevens et al. ............. 707/104.1 |
| 2007/0186005 | A1 | 8/2007 | Setlur et al. |
| 2008/0222504 | A1 * | 9/2008 | Chitturi ......................... 715/201 |
| 2009/0049075 | A1 | 2/2009 | Kim et al. |
| 2009/0094271 | A1 * | 4/2009 | Brewer et al. ................. 707/102 |
| 2009/0184970 | A1 | 7/2009 | Joung et al. |
| 2009/0232469 | A1 * | 9/2009 | Priddle et al. .................... 386/52 |
| 2009/0258594 | A1 * | 10/2009 | Martin-Cocher et al. ... 455/3.06 |
| 2011/0093880 | A1 * | 4/2011 | Paila et al. ....................... 725/25 |
| 2011/0145697 | A1 * | 6/2011 | Cha et al. ...................... 715/234 |
| 2011/0185275 | A1 * | 7/2011 | Cha et al. ...................... 715/234 |

FOREIGN PATENT DOCUMENTS

CN            1689046        10/2005

(Continued)

OTHER PUBLICATIONS

Ola Andersson et al., "Scalable Vector Graphics (SVG) Tiny 1.2 Specification", W3C Working Draft, Apr. 13, 2005.

(Continued)

*Primary Examiner* — Asghar Bilgrami
(74) *Attorney, Agent, or Firm* — The Farrell Law Firm, P.C.

(57) ABSTRACT

A method and apparatus for transmitting and receiving rich media content. A creator creates configuration information of each node formed in a hierarchical structure in a changeable format in which a driver can change the configuration information, and transmits content including the configuration information of each node to the driver. A driver receives the content, determines whether configuration information of each node formed in a hierarchical structure in the received content is created in the changeable format, reconfigures each node when the configuration information is created in the changeable format, and performs an application on the reconfigured node.

22 Claims, 3 Drawing Sheets

(56) References Cited

FOREIGN PATENT DOCUMENTS

| | | |
|---|---|---|
| EP | 1 594 287 | 11/2005 |
| JP | 2004-363655 | 12/2004 |
| JP | 2005-012472 | 1/2005 |
| KR | 1020070098395 | 10/2007 |
| KR | 1020080006942 | 1/2008 |
| KR | 1020080048054 | 5/2008 |

OTHER PUBLICATIONS

Jaeyeon Song et al., "LASeR in IPTV", International Organisation for Standardisation, Coding of Moving Pictures and Audio, ISO/IEC JTC1/SC29/WG11, MPEG2008, Apr. 25, 2008.

Information Technology—Coding of Audio-Visual Objects—Part 20: Lightweight Application Scene Representation (LASeR) and Simple Agregation Format (SAF) ISO/IEC JTC 1/SC 29, ISO/IEC FDIS 14496-20:2006(E), 3GPP Draft; May 9, 2006.

\* cited by examiner

METHOD AND APPARATUS FOR TRANSMITTING AND RECEIVING RICH MEDIA CONTENT

PRIORITY

This application claims priority under 35 U.S.C. §119(a) to a Korean Patent Application filed in the Korean Intellectual Property Office on Jul. 16, 2008 and assigned Serial No. 10-2008-0069343, the entire disclosure of which is incorporated herein by reference.

BACKGROUND OF THE INVENTION

1. Field of the Invention

The present invention relates generally to a method and apparatus for transmitting and receiving rich media content, and more particularly to a method and apparatus for transmitting and receiving objects of a rich media application.

2. Description of the Related Art

A rich media application is an application that includes multimedia content such as audio, video and text, interactive information exchange and control between a server and a client, interactive information exchange and control with users, temporal and spatial arrangements between these elements. Most noticeably, the rich media is generally distinguishable from the multimedia in terms of interactivity. That is, rich media is created in a structure that is described with information such as data indicating a temporal/spatial relationship, an event for expressing interactivity, and operation data, in addition to media data, graphic element data, and attribute data of respective element values, and these are each expressed in languages provided by a specific rich media engine. The languages, which can be applied in various ways, include, for example, MPEG4 Lightweight Application of Scene Representation (LASeR), MPEG4 Binary Format for Scene (BIFS), Scalable Vector Graphics (SVG) of World Wide Web Consortium (W3C), etc.

In order to drive the application, an operation of converting the above information pieces to a hierarchical structure is needed. The above operation is for layering or stratifying rich media elements from a root element (highest node) to a child element (lowest node) of the root in temporal/spatial order of driven elements. The hierarchical (or layered) structure is formed in a tree structure. One root may have a plurality of child nodes, and each node is composed of elements constituting the node, types of attributes representing each element, and respective attribute values. A rich media engine driving the application realizes each element in the hierarchical structure using its associated attribute type and attribute value. Herein, the attribute type will be referred to as "attribute."

The conventional rich media application provides a rich media service using hierarchical structure information of a content object created during the content object's creation. That is, the rich media application realizes completed-hierarchical structure information pieces of the created rich media information pieces, as they are, because it cannot realize a rich media service if at least one of node information pieces, i.e. element, attribute and attribute value, of a hierarchical structure, for realizing the rich media service is undefined. For this reason, the conventional driver should drive only the application created by a creator.

SUMMARY OF THE INVENTION

The present invention is designed to address at least the above-mentioned problems and/or disadvantages and to provide at least the advantages described below.

Accordingly, an aspect of the present invention provides an apparatus and method in which a creator, which uses a rich media application, transmits hierarchical structure information pieces to a driver, with at least one of an element, an attribute, and an attribute value that is undefined, or with only a default element designated. The driver can change a hierarchical structure with at least one of the element, the attribute, and the attribute value undefined into a completed hierarchical structure by recognizing the hierarchical information pieces, and then perform the application.

Another aspect of the present invention provides an apparatus and method in which a driver receives hierarchical structure information with at least one of an element, an attribute, and an attribute value that is undefined, checks information pieces constituting each of nodes forming a layer, and then creates a completed hierarchical structure using new elements or attribute values based on a condition presented by a creator, with regard to node information pieces which are uncompleted or can be changed.

In accordance with an aspect of the present invention, there is provided a method for transmitting content in a creator. The method includes creating configuration information of each node formed in a hierarchical structure in a changeable format in which a driver can change the configuration information; and transmitting content including the configuration information of each node to the driver.

In accordance with another aspect of the present invention, there is provided a method for receiving content in a driver. The method includes receiving the content; determining whether configuration information of each node formed in a hierarchical structure in the received content is created in a changeable format in which the driver can change the configuration information; reconfiguring each node according to a decision condition of the driver when the configuration information is created in the changeable format; and performing an application on the reconfigured node.

In accordance with another aspect of the present invention, there is provided an apparatus for transmitting content in a creator. The apparatus includes a content creator for creating configuration information of each node formed in a hierarchical structure in a changeable format in which a driver can change the configuration information; and a transmitter for transmitting content including the configuration information of each node to the driver.

In accordance with another aspect of the present invention, there is provided an apparatus for receiving content in a driver. The apparatus includes a receiver for receiving the content; a hierarchical structure creator for determining whether configuration information of each node formed in a hierarchical structure in the received content is created in a changeable format in which the driver can change the configuration information, and reconfiguring each node according to a decision condition of the driver when the configuration information is created in the changeable format; and a content executor for performing an application on the reconfigured node.

BRIEF DESCRIPTION OF THE DRAWINGS

The above and other aspects, features, and advantages of certain embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF EMBODIMENTS OF THE INVENTION

Figure 1:
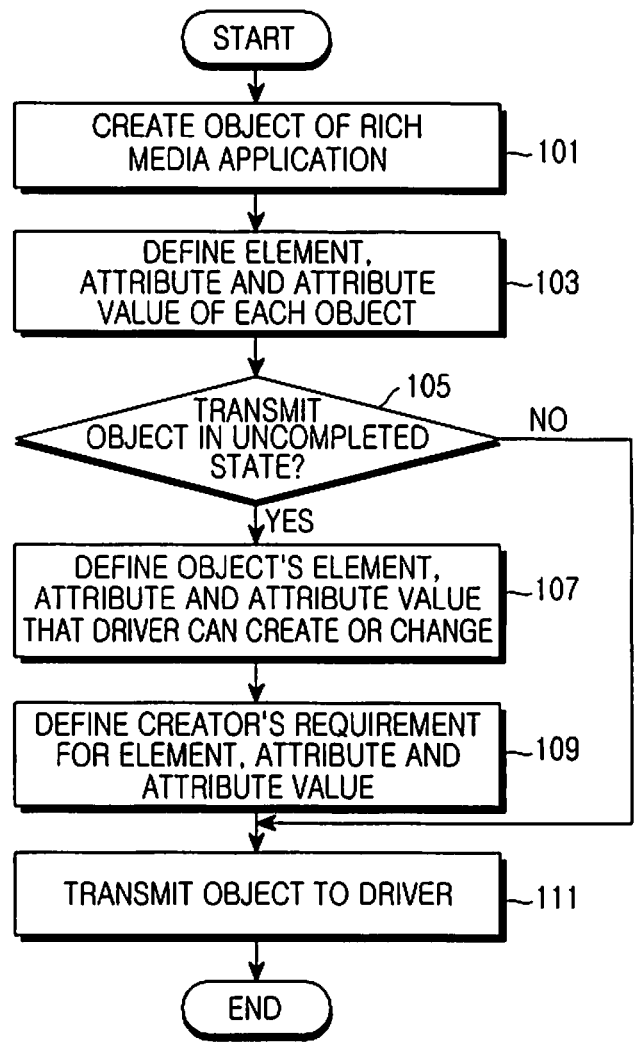
FIG. 1 is a flowchart illustrating an operation of a creator according to an embodiment of the present invention.

The matters defined in the description such as a detailed construction and elements are provided to assist in a comprehensive understanding of various embodiments of the present invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Conventionally, an application driver is realized with node information of a hierarchical structure created by a creator, but the creator creates a node with a completed hierarchical structure. However, in accordance with an embodiment of the present invention, a method and apparatus are provided in which an application creator creates and transmits content with a hierarchical structure that is uncompleted, and a driver completes the content with the hierarchical structure that is uncompleted and then drives the completed content.

The present invention supports a scheme in which no error should occur when a driver drives an application even in an uncompleted hierarchical structure, and the driver can express an intention of a creator even though the creator does not provide a completed hierarchical structure. That is, the creator, though it cannot designate hierarchical structure values, provides the driver with a condition or restriction so that its intention can be reflected in a completed application. Then the driver can complete the creation of objects of the application under the defined condition. In this manner, the driver can create an application desired by the creator, even though the creator does not provide all hierarchical structure information pieces of the application to the driver.

Further, conventionally, the driver drives only the application created by the creator. However, the present invention provides further functionality in that when the driver successfully decodes the uncompleted hierarchical structure from the creator and there is a condition for the pertinent object values, the driver can analyze the conditions and complete proper object creation based on the driver's decision.

The following embodiments of the present invention that will be described below use an MPEG4 Lightweight Application for Scene Representation (LASeR) language. However, it will be obvious to those skilled in the art that the present invention is not limited to this specific language and may use any other suitable language.

When object configuration of the rich media application is expressed in a hierarchical structure, each object, as described above, is expressed as one node, and each node includes three information pieces, i.e., an element, an attribute, and an attribute value. Therefore, in accordance with an embodiment of the present invention, a creator may create a hierarchical structure without designating at least one of the three information pieces, and the present invention separately provides a proposal for each of the element, the attribute, and the attribute value.

Table 1 below shows an example of a case where no attribute value is designated.

TABLE 1

...
<g id="adaptation01" ... > ... </g>
<rect id="adaptation02" fill="red"> ... </g>
<rect id="adaptation03" width="80" height="100"> ... </g>
<Change xlink:href="#adaptation02" attributeName="fill">
...

In Table 1, "<g>" and "<rect>" are commands that represent a rich media object, which are defined in LASeR. For example, "<rect>", which is a predetermined attribute, is a command to draw a rectangle. Further, "id", "fill", "width", and "height" are attributes of an element value of each rich media object, and indicate an identification (id), an expression of a particular color or pattern, a width, and a height, respectively. A "<change>" element value proposed in accordance with an embodiment of the present invention indicates that a value of a "fill" attribute of a rich media object with an "adaptation02" id attribute value is undesignated by the creator, or is an attribute value that can be newly created by the driver.

Table 2A below shows another example of the case where no attribute value is designated.

TABLE 2A

<g id="adaptation01" ... > ... </g>
<rect id="adaptation02" fill="red"> ... </g>
<rect id="adaptation03" width="80" height="100"> ... </g>
<Change xlink:href="#adaptation02" attibuteName="fill"
recommendValue "red yellow"/>
<Change xlink:href="#adaptation03" attibuteName="fill"
recommendValue="green blue"

In accordance with Table 2A, a driver can select a value of the "fill" attribute of a rich media object with an "adaptation02" id attribute value as one of "red" and "yellow".

Table 2B below shows an example of defining a recommendValue for indicating a value that the driver can select when the attribute value is undesignated.

TABLE 2B

<attribute name="recommendValue" type="recommendValueType" use="optional"/>
<complexType name="recommendValueType">
  <complexContent>
    <union>
      <simpleType>
        <xs:restriction base='NMTOKENS'/>
      </simpleType>
      <simpleType name='recommendValueList '>
        <list itemType='string'/>
      </simpleType>
      <simpleType name='RestrictedList'>
        <xs:restriction base='recommendValueLis'>
          <xs:pattern value=' (\|)'/>
        </xs:restriction>
      </xs:simpleType>
    </union>
  </complexContent>
</complexType>

Table 3 below shows an example of a case where no element value is designated.

TABLE 3

```
<g id="adaptation01" ... > ... </g>
<rect id="adaptation02" fill="red"> ... </g>
<rect id="adaptation03" width="80" height="100"> ...
<empty id="element01" defaultElementName="rect"/>
<empty id="element02" defaultElementName="circle" width="40"
height="30"/>
...
    <Change xlink:href="#element01"/>
<Change xlink:href="#element02" elementName="rect"/>
```

In accordance with Table 3, "empty" indicates that the driver can create the pertinent element, and the driver then has a unique right of determining through which algorithm the driver will select the element value.

Table 3 also shows an example in which using "defaultElementName", the creator designates a default element with which the driver will complete a scene, when the driver does not select an element for completing the scene through the selection based on the unique right of the driver. Here, an "empty" element may operate in cooperation with a "change" element that makes reference to the "empty" element, or may operate independently.

Table 4 below shows an example of a case where the creator designates an element and an attribute value that the driver cannot change or create.

TABLE 4

```
<g id="adaptation01" ... > ... </g>
<rect id="adaptation02" fill="red" unchangeable="true"> ... </g>
<rect id="adaptation03" width="80" height="100"> ... </g>
```

In accordance with Table 4, "rect", which is a rich media object with an "adaptation02" id attribute value, cannot be changed or created by the driver with regard to all attribute values for the value designated by the creator.

Table 5 below shows another example of the case where the creator designates an element and an attribute value that the driver cannot change or create.

TABLE 5

```
<g id="adaptation01" ... > ... </g>
<rect id="adaptation02" fill="red"> ... </g>
<rect id="adaptation03" width="80" height="100" fill="blue"> ... </g>
<UnChange xlink:href="#adaptation03" attibuteName="width height"/>
```

In accordance with Table 5, among attributes of "rect", which is a rich media object with an "adaptation03" id attribute value, "width" and "height" designated in an "UnChange" element cannot be changed and created by the driver. However, because a "fill" attribute of the "rect" is not designated in the "UnChange" element, it can be changed by the driver.

Table 6 below shows an example of a case where a definition is given of an element showing objects having a hierarchical structure completed by the creator, and elements showing a hierarchical structure of objects that the driver can change or create.

TABLE 6

```
...
    <Infra>
        <g id="adaptation01" ... > ... </g>
        <rect id="adaptation02" fill="red"> ... </g>
        <rect id="adaptation03" width="80"
            height="100"> ... </g>
    </Infra>
    <DeviceDep>
        <Element_List>
            <rect xlink:href="#adaptation02">
            <circle/>
        </Element_List>
        <Attribute_List>
            <Attribute_List(Change) Attribute_Name="width"/>
            <Attribute_List Attribute_Name="fill"
            xlink:href="#adaptation02"/>
            <Attribite_List Attribute_Name="fill"
            xlink:href="#adaptation03"/>
        </Attribute_List>
    </DeviceDep>
...
```

Referring to Table 6, an <infra> element includes an element and attributes that the driver cannot create or change, and a <DeviceDep> element enumerates or designates an element and attributes that the driver can create or change.

Figure 2:
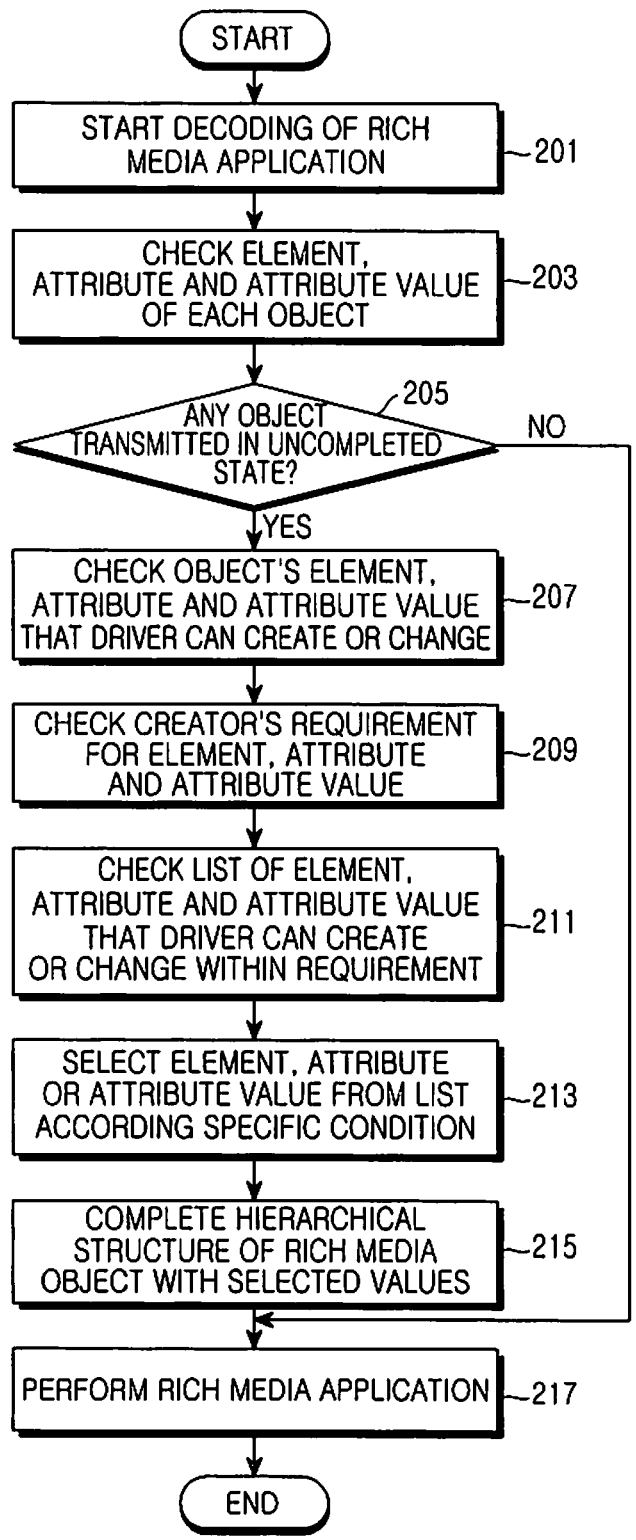
FIG. 2 is a flowchart illustrating an operation of a driver according to an embodiment of the present invention.

FIGS. 1 and 2 are flowcharts illustrating operations of a creator and a driver according to an embodiment of the present invention.

FIG. 1 is a flowchart illustration an operation of a creator according to an embodiment of the present invention. Physical locations of the creator and the driver are subject to change. For example, a server and a client device may serve as a creator and a driver, respectively, or the client device may serve as both the creator and the driver.

Referring to FIG. 1, the creator starts creating objects of a rich media application in step 101, and defines an element value, an attribute, and an attribute value of each object in step 103. The creator determines in step 105 whether to transmit the object in an uncompleted state. If the creator determines not to transmit the object in the uncompleted state, the creator creates the object defined in step 103 as done in the prior art and then transmits the created object to the driver in step 111. However, if the creator determines to transmit the object in the uncompleted state, the creator checks or defines an element, an attribute, or an attribute value to be left uncompleted, in step 107. The element, the attribute, or the attribute value to be left uncompleted can be designated using the examples of Table 1 through Table 3. The creator can also designate an object's element, attribute, or attribute value that the driver can create or change.

Thereafter, in step 109, the creator defines and inserts its requirements for the object values. Here, the requirements can be defined and inserted using the examples of Table 4 through Table 6. However, when there are no requirements, step 109 is optional. Thereafter, in step 111, the creator completes the object creation and delivers the created object to the driver.

FIG. 2 is a flowchart illustration an operation of a driver according to an embodiment of the present invention.

Referring to FIG. 2, the driver starts decoding of a rich media application in step 201. In step 203, the driver checks an element value, an attribute, and an attribute value in a hierarchical structure of an object of the application. The driver determines in step 205 whether there is any object transmitted in an uncompleted state. If there is no object transmitted in an uncompleted state, the driver performs the conventional rich media application in step 217. However, if there is an object transmitted in an uncompleted state, the driver checks details of an element, an attribute, and an attribute value of the object transmitted in an uncompleted state, in step 207. That is, the driver checks the object element, attribute, and attribute value that it can create or change. Thereafter, in step 209, the driver checks if there are creator requirements for the objects. In step 211, the driver checks a list of elements, attributes, or attribute values it can create and change within the requirements. The results may depend on resources of the driver and a criterion for selection within the requirements. That is, the results may undergo a change according to the driver even under the same requirements, or as occasion demands even for the same driver.

In step 213, the driver selects an element, an attribute, or an attribute value from the list according to a specific condition of the driver. Here, the term "specific condition of the driver" refers to a decision condition of the driver that completes the uncompleted element, attribute, and attribute value within the requirements or in a state where there are no requirements. For example, the decision condition may include any one of driver's resource capability and rich media application user's preference, and its detailed description will not be provided herein.

The driver completes a hierarchical structure of objects constituting the rich media application with the selected values in step 215, and executes the rich media application in step 217.

Figure 3:
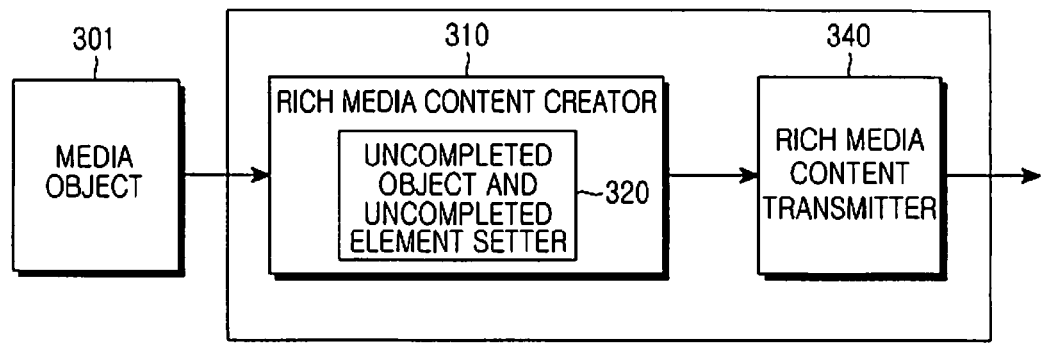
FIG. 3 is a block diagram of a creator apparatus according to an embodiment of the present invention.

FIG. 3 is a block diagram of a creator apparatus according to an embodiment of the present invention.

Referring to FIG. 3, the creator receives a media object 301, and then creates content of a rich media application in a rich media content creator 310. In the rich media content creator 310, a process of creating each constituent object is performed using rich media functions such as interactivity, temporal-spatial arrangements, events, and commands between media objects.

An uncompleted object and uncompleted element setter 320 creates a constituent object using setting information of uncompleted objects and uncompleted elements. The uncompleted object and uncompleted element setter 320 creates the constituent object by defining the creator requirements written in the examples of Table 4 through Table 6.

A rich media content transmitter 340 delivers rich media content including the constituent object to the driver. A process of encoding the rich media content may be further included in rich media content creator 310. It is to be noted that because the creator and the driver may physically exist in one device as described above, the rich media content transmitter 340 includes not only transmission to another device, but also delivery from a logical entity in the creator to a logical entity in the driver.

Figure 4:
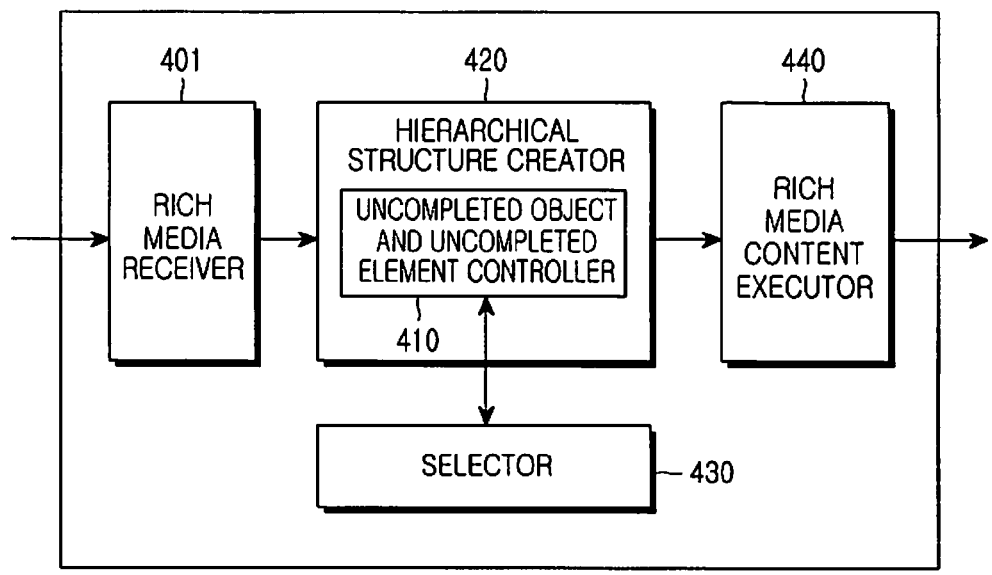
FIG. 4 is a block diagram of a driver apparatus according to an embodiment of the present invention.

FIG. 4 is a block diagram of a driver apparatus according to an embodiment of the present invention.

Referring to FIG. 4, a rich media receiver 401 in the driver receives a rich media application, and transmits the received rich media application to a hierarchical structure creator 420. The hierarchical structure creator 420 creates a hierarchical structure of the application, and an uncompleted object and uncompleted element controller 410 provided in the hierarchical structure creator 420 checks uncompleted objects and uncompleted elements in a hierarchical structure of each object. A selector 430 selects uncompleted element, attribute, and attribute value according to the creator requirements and the driver's selection. The selection process can be achieved using various algorithms and resources, and its detailed description will not be provided herein for simplicity.

A rich media content executor 440 executes the rich media content using the completed hierarchical structure. Here, executing rich media content includes replaying the rich media content in the driver.

As is apparent from the foregoing description, according to an embodiment of the present invention, an application creator can create and transmit content with a hierarchical structure uncompleted, and a driver can complete the content with a hierarchical structure uncompleted and then drives the completed content, thereby contributing to a reduction in creation load of the creator.

In addition, the present invention can provide a differentiated service between plural drivers using one common application made by the creator.

Embodiments of the present invention can also be embodied as computer-readable codes on a computer-readable recording medium. The computer-readable recording medium is any data storage device that can store data that can thereafter be read by a computer system. Examples of the computer-readable recording medium include, but are not limited to, Read-Only Memory (ROM), Random-Access Memory (RAM), CD-ROMs, magnetic tapes, floppy disks, optical data storage devices, and carrier waves (such as data transmission through the Internet via wired or wireless transmission paths). The computer-readable recording medium can also be distributed over network-coupled computer systems so that the computer-readable code is stored and executed in a distributed fashion. Also, function programs, codes, and code segments for accomplishing the present invention can be easily construed as within the scope of the invention by programmers skilled in the art to which the present invention pertains.

While the present invention has been shown and described with reference to certain embodiments thereof, it will be understood by those skilled in the art that various changes in form and details may be made therein without departing from the spirit and scope of the present invention as defined by the appended claims and their equivalents.

What is claimed is:

1. A method for transmitting content by a creator, comprising:
    creating, by the creator, configuration information of each node formed in a hierarchical structure in a changeable format in which a driver can change the configuration information, which includes at least one of an element, an attribute, and an attribute value; and
    transmitting content including the configuration information of each node to the driver,
    wherein the changeable format includes one of a format in which at least one of the element, the attribute, and the attribute value is undefined, and a format in which the creator designates a default element with which the driver will complete a scene.

2. The method of claim 1, wherein creating the configuration information comprises including a requirement of the creator in the configuration information of each node.

3. The method of claim 2, wherein the requirement of the creator indicates that the creator designates at least one of an element and an attribute value that the driver cannot change.

4. The method of claim 2, wherein the requirement of the creator indicates that the creator designates at least one of an element and an attribute value that the driver cannot create.

5. The method of claim 2, wherein the requirement of the creator indicates that the creator designates a value that the driver can select.

6. A method for receiving content in a driver, comprising:
receiving the content from a creator;
determining whether configuration information of each node formed in a hierarchical structure in the received content is created in a changeable format in which the driver can change the configuration information, which includes at least one of an element, an attribute, and an attribute value;
reconfiguring each node according to a decision condition of the driver when the configuration information is created in the changeable format; and
performing an application on the reconfigured node,
wherein the changeable format is one of a format in which at least one of the element, the attribute, and the attribute value is undefined, and a format in which the creator designates a default element with which the driver will complete a scene.

7. The method of claim 6, further comprising:
determining whether a requirement of the creator is included in a node for which at least one of the element, the attribute, and the attribute value is undefined;
creating each node according to the requirement of the creator, when the requirement of the creator is included in the node; and
performing an application on the created node.

8. The method of claim 7, wherein the requirement of the creator indicates that the creator designates at least one of the element and the attribute value that the driver cannot change.

9. The method of claim 7, wherein the requirement of the creator indicates that the creator designates at least one of the element and the attribute value that the driver cannot create.

10. The method of claim 7, wherein the requirement of the creator indicates that the creator designates a value that the driver can select.

11. The method of claim 6, wherein a decision condition of the driver includes at least one of a resource capability of the driver and a preference of a rich media application user.

12. An apparatus for transmitting content in a creator, comprising:
a content creator which creates configuration information of each node formed in a hierarchical structure in a changeable format in which a driver can change the configuration information, which includes at least one of an element, an attribute, and an attribute value; and
a transmitter which transmits content including the configuration information of each node to the driver,
wherein the changeable format comprises one of a format in which at least one of the element, the attribute, and the attribute value is undefined, and a format in which the creator designates a default element with which the driver will complete a scene.

13. The apparatus of claim 12, wherein the configuration information of each node comprises a requirement of the creator.

14. The apparatus of claim 12, wherein the requirement of the creator indicates that the creator designates at least one of an element and an attribute value that the driver cannot change.

15. The apparatus of claim 13, wherein the requirement of the creator indicates that the creator designates at least one of an element and an attribute value that the driver cannot create.

16. The apparatus of claim 13, wherein the requirement of the creator indicates that the creator designates a value that the driver can select.

17. An apparatus for receiving content in a driver, comprising:
a receiver which receives the content from a creator;
a hierarchical structure creator which determines whether configuration information of each node formed in a hierarchical structure in the received content is created in a changeable format in which the driver can change the configuration information, which includes at least one of an element, an attribute, and an attribute value, and reconfiguring each node according to a decision condition of the driver, when the configuration information is created in the changeable format; and
a content executor which performs an application on the reconfigured node,
wherein the changeable format comprises one of a format in which at least one of the element, the attribute, and the attribute value is undefined, and a format in which the creator designates a default element with which the driver will complete a scene.

18. The apparatus of claim 17, wherein the hierarchical structure creator determines whether a requirement of the creator is included in a node for which at least one of the element, the attribute, and the attribute value is undefined, and creates each node according to the requirement of the creator, when the requirement of the creator is included in the node.

19. The apparatus of claim 18, wherein the requirement of the creator indicates that the creator designates at least one of the element and the attribute value that the driver cannot change.

20. The apparatus of claim 18, wherein the requirement of the creator indicates that the creator designates at least one of the element and the attribute value that the driver cannot create.

21. The apparatus of claim 18, wherein the requirement of the creator indicates that the creator designates a value that the driver can select.

22. The apparatus of claim 17, wherein the decision condition of the driver comprises at least one of:
a resource capability of the driver; and
a preference of a rich media application user.

* * * * *